(12) United States Patent
Jang et al.

(10) Patent No.: US 12,507,396 B2
(45) Date of Patent: Dec. 23, 2025

(54) SEMICONDUCTOR STRUCTURE AND METHOD FOR MANUFACTURING SAME

(71) Applicant: CHANGXIN MEMORY TECHNOLOGIES, INC., Hefei (CN)

(72) Inventors: Semyeong Jang, Hefei (CN); Joonsuk Moon, Hefei (CN); Deyuan Xiao, Hefei (CN); Jo-Lan Chin, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 622 days.

(21) Appl. No.: 17/951,223

(22) Filed: Sep. 23, 2022

(65) Prior Publication Data
US 2023/0017651 A1  Jan. 19, 2023

Related U.S. Application Data

(63) Continuation of application No. PCT/CN2022/101040, filed on Jun. 24, 2022.

(30) Foreign Application Priority Data

Jun. 8, 2022  (CN) .......................... 202210644047.6

(51) Int. Cl.
*H10B 12/00* (2023.01)
*G11C 5/06* (2006.01)
*H10D 1/68* (2025.01)

(52) U.S. Cl.
CPC .......... *H10B 12/315* (2023.02); *G11C 5/063* (2013.01); *H10B 12/033* (2023.02); *H10B 12/05* (2023.02)

(58) Field of Classification Search
CPC .... H10B 12/315; H10B 12/033; H10B 12/05; G11C 5/063; H10D 1/716
See application file for complete search history.

(56) References Cited

U.S. PATENT DOCUMENTS

| 5,244,824 | A | 9/1993 | Sivan | |
| 6,239,460 | B1 * | 5/2001 | Kuroiwa | H10D 1/692 257/306 |
| 6,376,303 | B1 | 4/2002 | Seo | |
| 9,673,257 | B1 | 6/2017 | Takaki | |
| 2005/0164454 | A1 * | 7/2005 | Leslie | H10B 12/053 438/269 |

(Continued)

FOREIGN PATENT DOCUMENTS

| CN | 101017825 A | 8/2007 |
| CN | 101740500 A | 6/2010 |

(Continued)

*Primary Examiner* — David Vu
(74) *Attorney, Agent, or Firm* — Syncoda LLC; Feng Ma

(57) ABSTRACT

A semiconductor structure and a method for manufacturing the same are provided. The semiconductor structure includes a substrate, a gate structure and a dielectric layer. Herein, the substrate includes discrete semiconductor pillars. The semiconductor pillars are arranged at the top of the substrate and extend in a vertical direction. The substrate further includes a capacitor structure located at the top of the semiconductor pillar. The gate structure is arranged at the middle area of the semiconductor pillar and surrounds the semiconductor pillar. The dielectric layer is located between the gate structure and the semiconductor pillar, and covers the sidewall of the semiconductor pillar.

14 Claims, 22 Drawing Sheets

(56) References Cited

U.S. PATENT DOCUMENTS

| | | |
|---|---|---|
| 2006/0043471 A1 | 3/2006 | Tang |
| 2006/0046391 A1 | 3/2006 | Tang |
| 2007/0020819 A1 | 1/2007 | Tang |
| 2007/0048943 A1 | 3/2007 | Tang |
| 2007/0181925 A1 | 8/2007 | Yoon et al. |
| 2007/0224753 A1 | 9/2007 | Tang |
| 2008/0124869 A1* | 5/2008 | Yoon .............. H10B 12/053 257/E21.409 |
| 2009/0072291 A1 | 3/2009 | Takaishi |
| 2009/0207649 A1 | 8/2009 | Tang |
| 2010/0120221 A1 | 5/2010 | Kang |
| 2010/0213525 A1 | 8/2010 | Masuoka |
| 2011/0104862 A1 | 5/2011 | Kadoya |
| 2011/0171796 A1 | 7/2011 | Tang |
| 2012/0049256 A1* | 3/2012 | Lim .............. H10B 12/09 257/E27.06 |
| 2013/0011987 A1 | 1/2013 | Park |
| 2013/0056698 A1 | 3/2013 | Satoh |
| 2013/0075813 A1 | 3/2013 | Kadoya |
| 2015/0017767 A1 | 1/2015 | Masuoka et al. |
| 2015/0380548 A1 | 12/2015 | Wang et al. |
| 2016/0204251 A1 | 7/2016 | Masuoka et al. |
| 2017/0271510 A1 | 9/2017 | Wang et al. |
| 2017/0309632 A1 | 10/2017 | Masuoka et al. |
| 2017/0323977 A1 | 11/2017 | Cheng et al. |
| 2018/0083136 A1 | 3/2018 | Xie et al. |
| 2018/0096896 A1 | 4/2018 | Zhu |
| 2018/0175212 A1 | 6/2018 | Cheng et al. |
| 2019/0027570 A1 | 1/2019 | Ching et al. |
| 2019/0115438 A1 | 4/2019 | Ching et al. |
| 2019/0123053 A1 | 4/2019 | Masuoka et al. |
| 2019/0237581 A1 | 8/2019 | Saito et al. |
| 2019/0326395 A1 | 10/2019 | Ando et al. |
| 2020/0020812 A1 | 1/2020 | Masuoka et al. |
| 2020/0052084 A1 | 2/2020 | Ching et al. |
| 2021/0305431 A1 | 9/2021 | Ishimaru et al. |
| 2022/0069070 A1 | 3/2022 | Lai et al. |
| 2022/0102347 A1 | 3/2022 | Lai et al. |
| 2022/0139918 A1 | 5/2022 | Lee |
| 2022/0139920 A1 | 5/2022 | Lee |
| 2022/0199837 A1 | 6/2022 | Masuoka et al. |
| 2022/0262954 A1 | 8/2022 | Ishimaru et al. |

FOREIGN PATENT DOCUMENTS

| | | |
|---|---|---|
| CN | 101933135 A | 12/2010 |
| CN | 102867752 A | 1/2013 |
| CN | 105280698 A | 1/2016 |
| CN | 106252352 A | 12/2016 |
| CN | 107845578 A | 3/2018 |
| CN | 110476230 A | 11/2019 |
| CN | 110931429 A | 3/2020 |
| CN | 113078155 A | 7/2021 |
| CN | 113078156 A | 7/2021 |
| CN | 113451405 A | 9/2021 |
| CN | 114464535 A | 5/2022 |
| CN | 114497039 A | 5/2022 |
| EP | 1804286 A1 | 7/2007 |
| WO | 2013033267 A1 | 3/2013 |

* cited by examiner

SEMICONDUCTOR STRUCTURE AND METHOD FOR MANUFACTURING SAME

CROSS-REFERENCE TO RELATED APPLICATIONS

The present application is a U.S. continuation application of International Application No. PCT/CN2022/101040, filed on Jun. 24, 2022, which claims priority to Chinese Patent Application No. 202210644047.6, filed on Jun. 8, 2022. International Application No. PCT/CN2022/101040 and Chinese Patent Application No. 202210644047.6 are incorporated herein by reference in their entireties.

BACKGROUND

As the integration density of a dynamic memory develops higher and higher, the electrical performance of the small-size functional device needs to be improved, while the arrangement of transistors in a dynamic memory array structure and how to reduce the size of a single functional device in the dynamic memory array structure are studied.

Higher density efficiency may be achieved when a Vertical Gate All Around (VGAA) transistor structure is used as an access transistor of the dynamic memory. However, in the related art, the electrical performance of the access transistor and a capacitor connected therewith is low.

SUMMARY

In view of this, embodiments of the present disclosure provide a semiconductor structure and a method for manufacturing the same, which may improve the electrical performance of an access transistor and a capacitor connected therewith, thereby improving the overall electrical performance of the semiconductor structure.

The technical solutions of the embodiments of the present disclosure are implemented as follows.

The embodiments of the present disclosure provide a semiconductor structure, which includes a substrate, a gate structure, and a dielectric layer.

The substrate includes discrete semiconductor pillars. The semiconductor pillars are arranged at the top of the substrate and extend in a vertical direction. The substrate further includes a capacitor structure located at the top of the semiconductor pillar.

The gate structure is arranged at the middle area of the semiconductor pillar and surrounds the semiconductor pillar.

The dielectric layer is located between the gate structure and the semiconductor pillar, and covers the sidewall of the semiconductor pillar.

The embodiments of the present disclosure also provide a method for manufacturing a semiconductor structure, which includes the following operations.

A substrate is provided. The substrate includes discrete semiconductor pillars. The semiconductor pillars are arranged at the top of the substrate and extend in a vertical direction. The substrate further includes an initial electrode plate structure located at the top of the semiconductor pillar.

A dielectric layer is formed on the sidewall of the semiconductor pillar.

A gate structure is formed at the middle area of the semiconductor pillar. The gate structure surrounds the semiconductor pillar. The dielectric layer is located between the gate structure and the semiconductor pillar.

A capacitor structure is formed at the initial electrode plate structure.

DETAILED DESCRIPTION

In order to make the purposes, technical solutions and advantages of the present disclosure clearer, the technical solutions of the present disclosure are further described in detail below in combination with the accompanying drawings and the embodiments. The described embodiments should not be regarded as limitations to the present disclosure. All other embodiments obtained by those of ordinary skill in the art without creative work shall fall within the scope of protection of the present disclosure.

In the following description, reference is made to "some embodiments" which describe a subset of all possible embodiments. However, it is understood that "some embodiments" may be a same subset or different subsets of all possible embodiments, and may be combined with each other without conflict.

If a description such as "first/second" appears in the application document, the following explanation will be added. In the following description, the involved terms "first/second/third" are only used to distinguish similar objects, and do not represent a specific order of the objects. It is understood that the specific order or sequence of "first/second/third" may be interchangeable if applicable, so that the embodiments of the present disclosure described herein may be implemented in an order other than those shown or described herein.

Unless otherwise defined, all technical and scientific terms used herein have the same meanings as those commonly understood by those skilled in the art of the present disclosure. The terms herein are only used for the purpose of describing the embodiments of the present disclosure and are not intended to limit the present disclosure.

Figure 1:
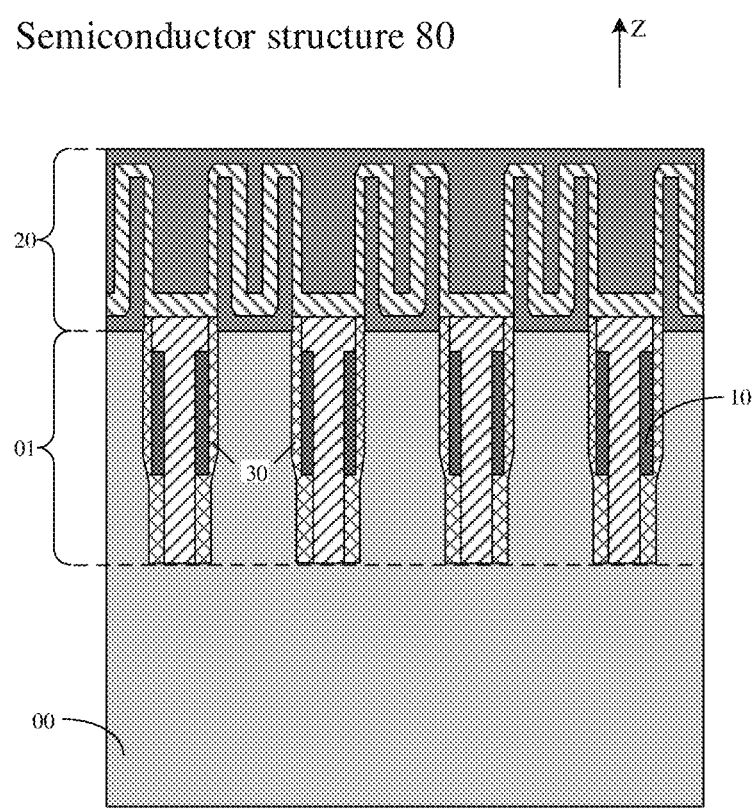
FIG. 1 is a schematic diagram I of a semiconductor structure according to an embodiment of the present disclosure.

FIG. 1 is an optional schematic structural diagram of a semiconductor structure according to an embodiment of the present disclosure, and FIG. 1 is a cross-sectional view. As shown in FIG. 1, the semiconductor structure 80 includes: a substrate 00, a gate structure 10, and a dielectric layer 30.

The substrate 00 includes discrete semiconductor pillars 01. The semiconductor pillars 01 are arranged at the top of the substrate 00 and extend in a vertical direction Z. The semiconductor structure further includes a capacitor structure 20 located at the top of the semiconductor pillar 01.

The gate structure 10 is arranged at the middle area of the semiconductor pillar 01 and surrounds the semiconductor pillar 01.

The dielectric layer 30 is located between the gate structure 10 and the semiconductor pillar 01, and covers the sidewall of the semiconductor pillar 01.

In the embodiments of the present disclosure, the substrate 00 may include at least one of semiconductor materials, for example, elements of group IV such as silicon (Si), germanium (Ge), and silicon germanium (SiGe), or compounds of group III-V such as gallium arsenide (GaAs), aluminum gallium arsenide (AlGaAs), indium arsenide (InAs), or indium gallium arsenide (InGaAs). Exemplarily, the substrate 00 including silicon element is illustrated hereinafter.

The semiconductor pillar 01 may have a doping element to improve its conductivity. Herein, the doping element may be a P-type doping element or an N-type doping element. The N-type doping element may be at least one of an arsenic (As) element, a phosphorus (P) element, or an antimony (Sb) element. The P-type doping element may be at least one of a boron (B) element, an indium (In) element, or a gallium (Ga) element.

The material of the gate structure 10 may be polysilicon, titanium nitride (TiN), or at least one of conductive materials such as tantalum nitride (TaN), copper (Cu), or tungsten (W). Exemplarily, titanium nitride is illustrated hereinafter.

In the embodiment of the present disclosure, referring to FIG. 1, the semiconductor pillar 01 and the gate structure 10 may constitute a first transistor. Herein, the gate structure 10 forms a gate of the first transistor. The part, surrounded by the gate structure 10, of the semiconductor pillar 01 forms a channel of the first transistor. The semiconductor pillar 01 on either side of the channel of the first transistor respectively forms a source or drain of the first transistor.

The first transistor is a VGAA transistor. That is, the channel of the first transistor extends in the vertical direction Z, and the gate structure 10 surrounds the channel of the first transistor. Therefore, under the same size, compared with the transistor structures such as a Fin Field-Effect Transistor (FinFET), etc., the gate of the first transistor may cover the channel more sufficiently, so that the control ability of the gate is stronger.

In the embodiment of the present disclosure, the semiconductor structure 80 further includes the capacitor structure 20. The capacitor structure 20 is located at the top of the semiconductor pillar 01. An electrode plate of the capacitor structure 20 and the semiconductor pillar 01 may both be formed by processing based on the semiconductor material provided by the substrate 00. The material of the electrode plate of the capacitor structure 20 may be a reaction product of a metal and the semiconductor material of the substrate 00 to ensure that the electrode plate has sufficient conductivity. For example, if the substrate 00 provides a silicon substrate, the material of the electrode plate of the capacitor structure 20 includes a metal silicide.

Then, since the semiconductor pillar 01 and the electrode plate of the capacitor structure 20 may both be formed by processing based on the semiconductor material provided by the substrate 00, the semiconductor pillar 01 may be formed by doping the semiconductor material, and the electrode plate of the capacitor structure 20 may be formed by reacting the semiconductor material with a material containing a metal element, the processing of the semiconductor pillar 01 and the electrode plate of the capacitor structure 20 may be performed at the same time. That is, the semiconductor pillar 01 and the electrode plate of the capacitor structure 20 may be formed on the substrate 00 at the same time. It is not necessary to form the semiconductor pillar 01 first, and then form the electrode plate of the capacitor structure 20 on the semiconductor pillar 01 by deposition or other methods.

It is understood that, on the one hand, the semiconductor pillar 01 and the capacitor structure 20 are of a one-piece structure, and their connection is tighter and the contact resistance is lower, so that the overall performance of the semiconductor structure 80 may be improved. On the other hand, the one-piece structure allows the overall height of the semiconductor pillar 01 and the capacitor structure 20 to be reduced, thereby improving the integration degree of the semiconductor structure 80 in the vertical direction. Further, the processing of the semiconductor pillar 01 and the electrode plate of the capacitor structure 20 may be performed at the same time, so that the process steps are simplified, thereby improving the efficiency and saving the cost.

Figure 2A:
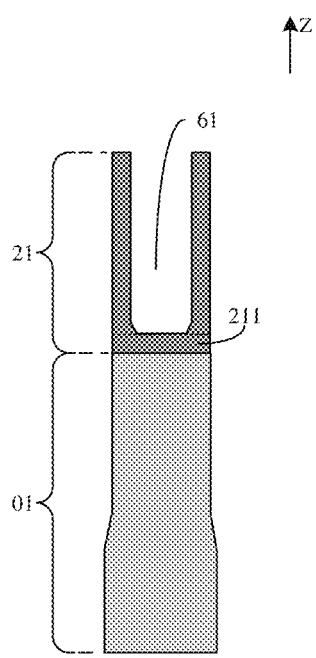
FIG. 2A is a schematic diagram II of a semiconductor structure according to an embodiment of the present disclosure.

FIG. 2A is a local schematic structural diagram of a semiconductor structure 80 shown in FIG. 1.

In some embodiments of the present disclosure, referring to FIG. 1 and FIG. 2A, the capacitor structure 20 includes a first electrode plate 21. The first electrode plate 21 is provided with a groove structure 61, and the first electrode plate 21 includes a first contact part 211. The first contact part 211 is perpendicular to the vertical direction Z, and covers the top surface of the semiconductor pillar 01.

In the embodiment of the present disclosure, referring to FIG. 2A, the first electrode plate 21 and the semiconductor pillar 01 are of a one-piece structure, and the first contact part 211 of the first electrode plate 21 is electrically connected with the semiconductor pillar 01. The first contact part 211 is arranged perpendicular to the vertical direction Z, and covers the top surface of the semiconductor pillar 01.

The first electrode plate 21 forms the groove structure 61 above the first contact part 211, and FIG. 2A shows a cross-sectional structure of the groove structure 61. The dielectric layer and other electrode plates of the capacitor structure 20 may be formed in the groove structure 61, and the dielectric layer and other electrode plates of the capacitor structure 20 may be formed by covering the inner sidewall of the groove structure 61.

Figure 2B:
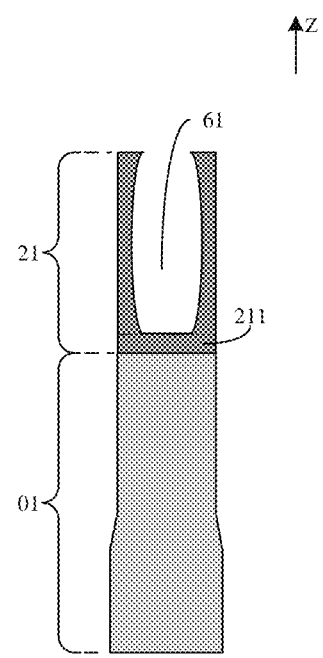
FIG. 2B is a schematic diagram III of a semiconductor structure according to an embodiment of the present disclosure.

It is to be noted that, the shape of the groove structure 61 may be processed as required, and its shape is not limited to the example shown in FIG. 2A. The groove structure 61 may be processed to have an inner sidewall of an irregular shape, that is, the section profile of the inner sidewall of the groove structure 61 may include irregular lines such as arcs. FIG. 2B shows another optional shape of the groove structure 61. As shown in FIG. 2B, the section profile of the inner sidewall of the groove structure 61 is the arc, and the width of the middle part of the groove structure 61 is larger than that of the top or bottom of the groove structure 61. Compared with FIG. 2A, the area of the inner sidewall of the groove structure 61 shown in FIG. 2B is larger, and the dielectric layer and other electrode plates of the capacitor structure 20 cover the inner sidewall of the groove structure 61. Therefore, the relative area of the electrode plate of the capacitor structure 20 may be increased, and the capacitance of the capacitor structure 20 may be increased.

Figure 3A:
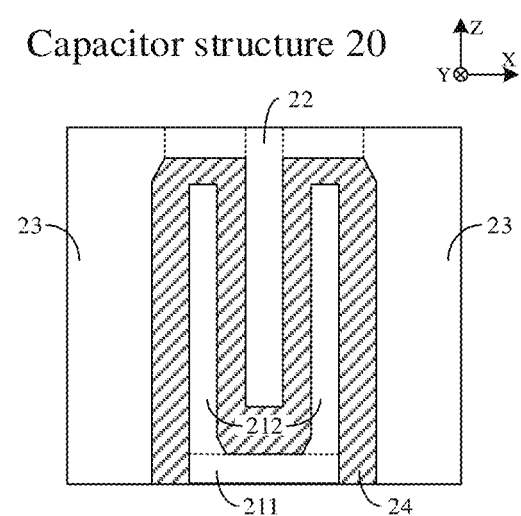
FIG. 3A is a schematic diagram IV of a semiconductor structure according to an embodiment of the present disclosure.
Figure 3B:
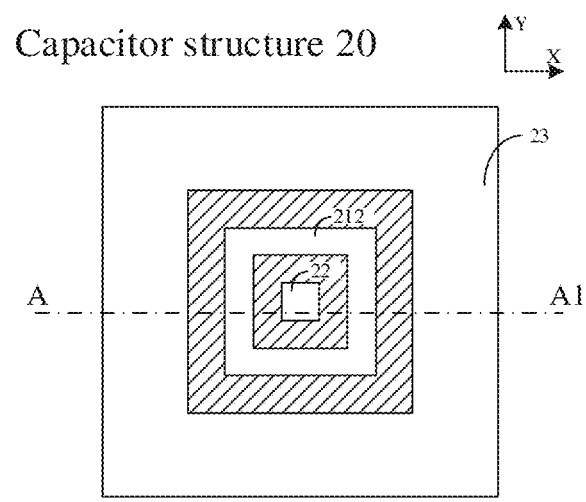
FIG. 3B is a schematic diagram V of a semiconductor structure according to an embodiment of the present disclosure.
Figure 4A:
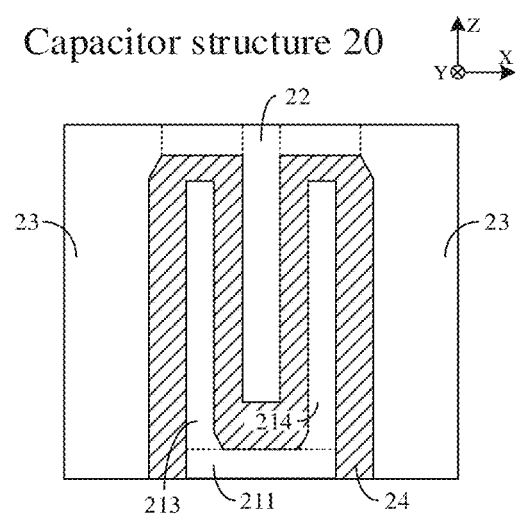
FIG. 4A is a schematic diagram VI of a semiconductor structure according to an embodiment of the present disclosure.
Figure 4B:
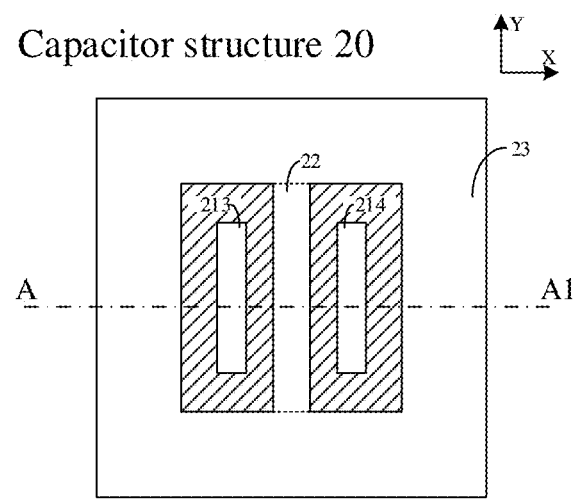
FIG. 4B is a schematic diagram VII of a semiconductor structure according to an embodiment of the present disclosure.

FIG. 3A, FIG. 3B, FIG. 4A and FIG. 4B are schematic structural diagrams of the capacitor structure 20, and show a local structure of the capacitor structure 20 shown in FIG. 1. Herein, FIG. 3B and FIG. 4B are top views, FIG. 3A is a cross-sectional view cut along a cross-sectional line A-A1 in FIG. 3B, and FIG. 4A is a cross-sectional view cut along the cross-sectional line A-A1 in FIG. 4B.

It is to be noted that, for clarity, the electrode plate of the capacitor structure 20 in FIG. 3A, FIG. 3B, FIG. 4A and FIG. 4B are filled with white. A first direction X and a second direction Y shown in FIG. 3A, FIG. 3B, FIG. 4A and FIG. 4B are both perpendicular to the vertical direction Z shown in FIG. 1. The first direction X and the second direction Y may be perpendicular to each other, and may also form any included angle. Exemplarily, it is illustrated hereinafter that the first direction X is perpendicular to the second direction Y.

In some embodiments of the present disclosure, referring to FIG. 2A, FIG. 3A and FIG. 3B, the first electrode plate 21 further includes a second contact part 212. The second contact part 212 is located on the first contact part 211 and is arranged around the first contact part 211. The second contact part 212 extends in the vertical direction Z and is connected to the edge of the first contact part 211. The thickness of the second contact part 212 is smaller than the width of the semiconductor pillar 01.

In the embodiment of the present disclosure, referring to FIG. 2A and FIG. 3A, the second contact part 212 is connected on the first contact part 211, and the second contact part 212 is connected to the edge of the first contact part 211. The first contact part 211 and the second contact part 212 are of a one-piece structure, that is, the first contact part 211 and the second contact part 212 may be formed by processing on the semiconductor material provided by the substrate at the same time.

Referring to FIG. 3A and FIG. 3B, the second contact part 212 is arranged around the first contact part 211. That is, in a top view, the second contact part 212 is annular, as shown in FIG. 3B.

In some embodiments of the present disclosure, referring to FIG. 2A, FIG. 4A and FIG. 4B, the first electrode plate 21 further includes: a third contact part 213 and a fourth contact part 214. The third contact part 213 and the fourth contact part 214 are separately arranged on the first contact part 211. The third contact part 213 and the fourth contact part 214 both extend in the vertical direction Z. The third contact part 213 and the fourth contact part 214 are respectively connected to the edge of the first contact part 211. The thicknesses of the third contact part 213 and the fourth contact part 214 are both smaller than the width of the semiconductor pillar 01.

In the embodiment of the present disclosure, referring to FIG. 2A and FIG. 4A, the third contact part 213 and the fourth contact part 214, which are discrete, are connected on the first contact part 211, and the third contact part 213 and the fourth contact part 214 are respectively connected to the edge of the first contact part 211. The first contact part 211, the third contact part 213 and the fourth contact part 214 are also of a one-piece structure, that is, the first contact part 211, the third contact part 213 and the fourth contact part 214 may be formed by processing on the semiconductor material provided by the substrate at the same time.

Referring to FIG. 4A and FIG. 4B, the third contact part 213 and the fourth contact part 214 are separately arranged on the first contact part 211. That is, in a top view, the third contact part 213 and the fourth contact part 214 are two parts which are not connected to each other.

In some embodiments of the present disclosure, referring to FIG. 2A, FIG. 3A and FIG. 3B, or FIG. 2A, FIG. 4A and FIG. 4B, the capacitor structure 20 further includes: a second electrode plate 22 and a third electrode plate 23. The second electrode plate 22 is arranged inside the first electrode plate 21, and the third electrode plate 23 is arranged outside the first electrode plate 21. A capacitor dielectric layer 24 is further arranged between the second electrode plate 22 and the first electrode plate 21, and between the third electrode plate 23 and the first electrode plate 21.

In the embodiment of the present disclosure, the second electrode plate 22 is arranged inside the first electrode plate 21, and the third electrode plate 23 is arranged outside the first electrode plate 21. Referring to FIG. 2A, FIG. 3A and FIG. 3B, if the first electrode plate 21 includes the second contact part 212, then the inside of the first electrode plate 21 refers to an area within the area surrounded by the second contact part 212 in a top view, and the outside of the first electrode plate 21 refers to an area outside the second contact part 212 in a top view.

Referring to FIG. 2A, FIG. 4A and FIG. 4B, the second electrode plate 22 and the third electrode plate 23 are of a one-piece structure. If the first electrode plate 21 includes the third contact part 213 and the fourth contact part 214, then the inside of first electrode plate 21 refers to an area between the third contact part 213 and the fourth contact part 214 in a top view, and the outside of the first electrode plate 21 refers to the part other than the area between the third contact part 213 and the fourth contact part 214.

In the embodiment of the present disclosure, referring to FIG. 3A and FIG. 3B, or FIG. 4A and FIG. 4B, the capacitor dielectric layer 24 is arranged between the second electrode plate 22 and the first electrode plate 21, and the capacitor dielectric layer 24 is also arranged between the third electrode plate 23 and the first electrode plate 21. In this way, the second electrode plate 22 and the first electrode plate 21 may form a set of directly opposite electrode plates, and the third electrode plate 23 and the first electrode plate 21 may also form a set of directly opposite electrode plates, so that a structure of a "double-sided capacitor" may be formed. Moreover, referring to FIG. 3A or FIG. 4A, the top of the second electrode plate 22 and the top of the third electrode plate 23 are electrically connected. The second electrode plate 22 and the third electrode plate 23 may together constitute an upper electrode plate of the capacitor structure 20, and the first electrode plate 21 may constitute a lower electrode plate of the capacitor structure 20. The upper electrode plate and the lower electrode plate serve as the two electrode plates of the capacitor structure 20, which may achieve the electrical performance of the capacitor.

It is understood that the use of the structure of the "double-sided capacitor" may increase the directly opposite electrode plate area between the upper electrode plate and the lower electrode plate of the capacitor structure 20, thereby increasing the capacitance of the capacitor structure 20.

In some embodiments of the present disclosure, referring to FIG. 2A and FIG. 2B, the material of the semiconductor pillar 01 includes a silicon element semiconductor. The material of the first electrode plate 21 includes at least a metal silicide.

In the embodiment of the present disclosure, the semiconductor pillar 01 and the first electrode plate may be formed by processing based on the semiconductor material provided by the substrate. Herein, the semiconductor pillar 01 may be formed by doping the semiconductor material, and the first electrode plate 21 may be formed by reacting the semiconductor material with a material containing a metal element. In a case where the substrate is a silicon substrate, the material of the semiconductor pillar 01 includes the silicon element semiconductor, and the material of the first electrode plate 21 includes at least the metal silicide. Here, the metal silicide includes at least one of cobalt silicide, nickel silicide, molybdenum silicide, titanium silicide, tungsten silicide, tantalum silicide or platinum silicide. In some embodiments, the material of the first electrode plate 21 substantially includes cobalt silicide (CoSi).

It is understood that, on the one hand, the semiconductor pillar 01 and the first electrode plate 21 are of a one-piece structure, and their connection is tighter and the contact resistance is lower, so that the overall performance of the semiconductor structure 80 may be improved. On the other hand, the one-piece structure allows the overall height of the semiconductor pillar 01 and the first electrode plate 21 to be reduced, thereby improving the integration degree of the semiconductor structure 80 in the vertical direction. Further, the processing of the semiconductor pillar 01 and the first electrode plate 21 may be performed at the same time, so that the process steps are simplified, thereby improving the efficiency and saving the cost.

Figure 5:
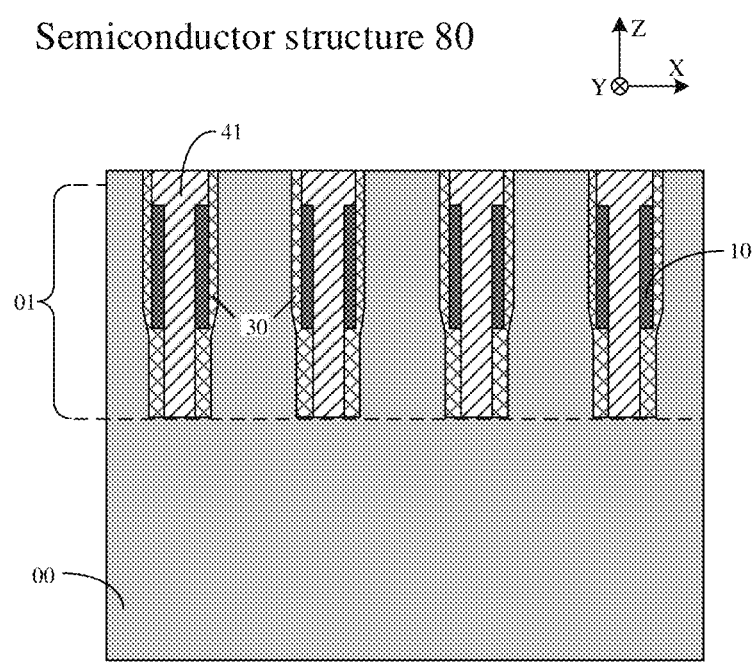
FIG. 5 is a schematic diagram VIII of a semiconductor structure according to an embodiment of the present disclosure.
Figure 6:
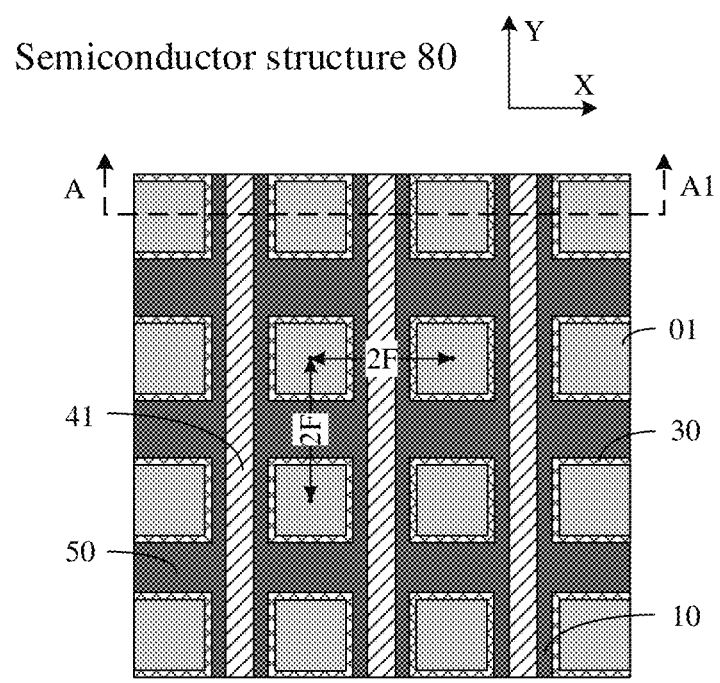
FIG. 6 is a schematic diagram IX of a semiconductor structure according to an embodiment of the present disclosure.

FIG. 5 and FIG. 6 show part of the structure below the capacitor structure in the semiconductor structure. Herein, FIG. 6 is a top view, and FIG. 5 is a cross-sectional view cut along the cross-sectional line A-A1 in FIG. 6.

In some embodiments of the present disclosure, as shown in FIG. 5 and FIG. 6, the semiconductor structure 80 further includes a first isolation layer 41. The first isolation layer 41 is located between the adjacent semiconductor pillars 01, and the gate structure 10 is located between the first isolation layer 41 and the semiconductor pillar 01.

In the embodiment of the present disclosure, the first isolation layer 41 extends in the second direction Y to isolate the adjacent semiconductor pillars 01. In addition, the gate structures 10 arranged in the second direction Y are connected to each other to form a word line 50 extending in the second direction Y. As shown in FIG. 6, the first isolation layer 41 is also configured to isolate the adjacent word lines 50. The material of the first isolation layer 41 may be silicon nitride (SiN).

In the embodiment of the present disclosure, the first isolation layer 41 further covers the top surface of the gate structure 10. The width of the first isolation layer 41 is greater than the thickness of the dielectric layer 30. Therefore, the first isolation layer 41 protects the gate structure 10 and isolates and insulates the gate structure 10 from other areas located above.

It is understood that, since the gate structure 10 forms the word line 50, that is, the word line 50 is in contact with the semiconductor pillar 01 through the gate structure 10. Moreover, since the gate structure 10 is arranged around the semiconductor pillar 01, the contact area between the gate structure 10 and the semiconductor pillar 01 is increased. Therefore, the contact area between the word line 50 and the semiconductor pillar 01 is increased, and the control ability of the word line 50 on the first transistor is improved.

In the embodiment of the present disclosure, referring to FIG. 6, in a top view, the size of the semiconductor pillar 01 meets $4F^2$ (F: the minimum pattern size obtainable under a given process condition). That is, the distance between the center points of two adjacent semiconductor pillars 01 in the first direction X is 2F, and the distance between the center points of two adjacent semiconductor pillars 01 in the second direction Y is also 2F. Therefore, the integration density of the semiconductor structure 80 is improved. In some embodiments, when a storage unit is formed on the semiconductor pillar 01, the storage unit may also be arranged according to $4F^2$.

Figure 7:
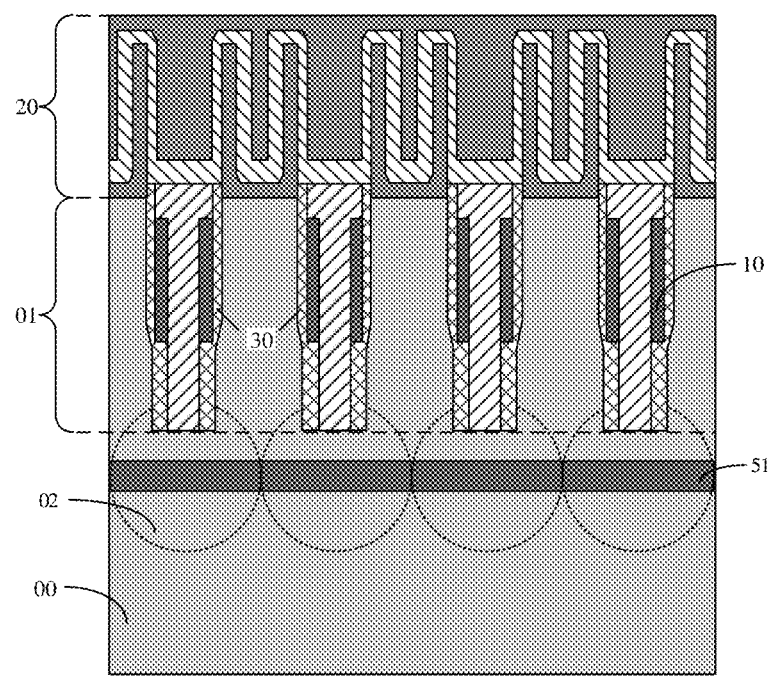
FIG. 7 is a schematic diagram X of a semiconductor structure according to an embodiment of the present disclosure.

In some embodiments of the present disclosure, as shown in FIG. 7, the semiconductor structure 80 further includes a bit line 51. The bit line 51 is located in the substrate 00, and the bottom of the semiconductor pillar 01 is electrically connected with the bit line 51.

In the embodiment of the present disclosure, referring to FIG. 7, the bit line 51 extends in the first direction X. The substrate 00 may further include a metal silicide structure 02 (an area surrounded by a circular dotted line), and the metal silicide structures 02 located at the bottom of the semiconductor pillar 01 are connected with each other to form the bit line 51. The bit line 51 is in contact with the bottom of the semiconductor pillar 01.

In the embodiment of the present disclosure, the material of the metal silicide structure 02 includes at least one of cobalt silicide, nickel silicide, molybdenum silicide, titanium silicide, tungsten silicide, tantalum silicide, or platinum silicide.

It is understood that, compared with an un-metallized semiconductor material, the metal silicide structure 02 has a relatively small resistivity, which is beneficial to reduce the resistance of the bit line 51 and reduce the contact resistance between the bit line 51 and the semiconductor pillar 01, thereby further improving the electrical performance of the semiconductor structure 80.

In the embodiment of the present disclosure, as shown in FIG. 6 and FIG. 7, the bottom of the semiconductor pillar 01 is used as one of the source or the drain of the first transistor, and may be electrically connected with the bit line 51. The gate structure 10 is used as the gate of the first transistor, and a plurality of gate structures 10 arranged in the second direction Y are connected to each other to form the word line 50. The top of the semiconductor pillar 01 is used as the other one of the source or the drain of the first transistor, which may be electrically connected with the capacitor structure 20.

Figure 8:
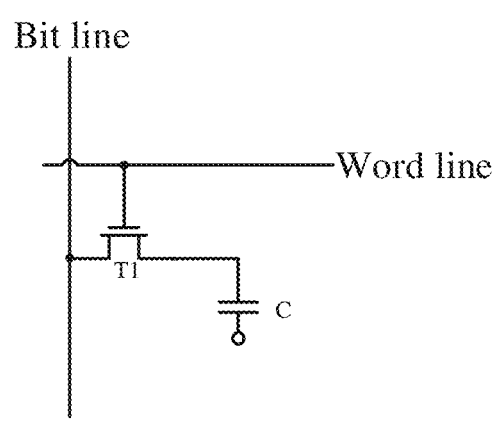
FIG. 8 is a schematic diagram XI of a semiconductor structure according to an embodiment of the present disclosure.

Therefore, the semiconductor structure 80 may form a circuit illustrated in FIG. 8. The first electrode of the first transistor T1 is connected with the bit line, the second electrode of the first transistor T1 is connected with a capacitor C, and the gate of the first transistor T1 is connected with the word line. In this way, a circuit structure of 1T-1C, that is, the circuit structure of one transistor and one capacitor, is formed, and may be used in the storage unit of a memory such as a Dynamic Random Access Memory (DRAM). In the circuit structure of 1T-1C, the first transistor T1 may be turned on in response to a signal on the word line, thereby transferring the charges stored in the capacitor C into the bit line (i.e. "reading out"), or storing the charges into the capacitor C via a signal on the bit line (i.e. "writing in").

FIG. 9 to FIG. 20 are local schematic structural diagrams of the semiconductor structure in each step, which are configured to describe and clearly show the steps of a method for manufacturing the semiconductor structure. Herein, except for FIG. 12, all are cross-sectional views. Both the first direction X and the second direction Y shown in FIG. 9 to FIG. 20 are perpendicular to the vertical direction Z shown in FIG. 1. The first direction X and the second direction Y may be perpendicular to each other, and may also form any included angle. Exemplarily, it is illustrated hereinafter that the first direction X is perpendicular to the second direction Y.

Referring to FIG. 9 to FIG. 20, the embodiments of the present disclosure also provide a method for manufacturing a semiconductor structure, which includes S101 to S103. The method will be described with reference to each step.

At S101, a substrate 00 is provided.

Figure 9:
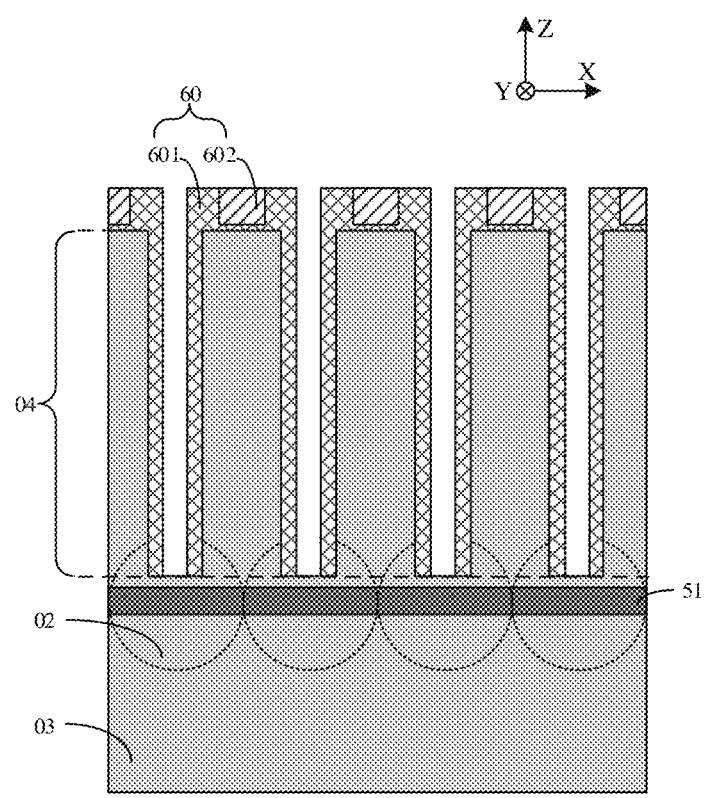
FIG. 9 is a schematic diagram I of a method for manufacturing a semiconductor structure according to an embodiment of the present disclosure.

In the embodiment of the present disclosure, referring to FIG. 9, firstly, an initial substrate 03 may be provided. The initial substrate 03 includes discrete initial semiconductor pillars 04. The initial semiconductor pillars 04 are arranged at the top of the initial substrate 03 and extend in a vertical direction Z.

Herein, the initial substrate 03 may include at least one of semiconductor materials, for example, elements of group IV such as silicon (Si), germanium (Ge), and silicon germanium (SiGe), or compounds of group III-V such as gallium arsenide (GaAs), aluminum gallium arsenide (AlGaAs), indium arsenide (InAs), or indium gallium arsenide (In- GaAs). Exemplarily, the initial substrate 03 including the silicon element is illustrated hereinafter. The initial semiconductor pillar 04 may have a doping element to improve the conductivity of the initial semiconductor pillar 04. Herein, the doping element may be a P-type doping element or an N-type doping element. The N-type doping element may be at least one of an arsenic (As) element, a phosphorus (P) element, or an antimony (Sb) element. The P-type doping element may be at least one of a boron (B) element, an indium (In) element, or a gallium (Ga) element.

In the embodiment of the present disclosure, referring to FIG. 9, a bit line 51 is further arranged in the initial substrate 03. The bit line 51 extends in a first direction X. The initial substrate 03 may further include a metal silicide structure 02 (an area surrounded by a circular dotted line), and the metal silicide structures 02 arranged in the first direction X are connected with each other to form the bit line 51. The bottom of the initial semiconductor pillar 04 is electrically connected to the bit line 51. The material of the metal silicide structure 02 includes at least one of cobalt silicide, nickel silicide, molybdenum silicide, titanium silicide, tungsten silicide, tantalum silicide, or platinum silicide.

Referring to FIG. 9, the initial semiconductor pillar 04 is also covered with a mask layer 60. A first part 601 of the mask layer 60 covers the sidewall and the top of the initial semiconductor pillar 04, and the middle of the first part 601 is filled with a second part 602 of the mask layer 60. The materials of the first part 601 and the second part 602 of the mask layer 60 are different. For example, the material of the first part 601 is silicon oxide, and the material of the second part 602 is silicon nitride.

Herein, the forming process of the mask layer 60 includes that: the first part 601 is formed on the surface of the initial semiconductor pillar 04, and the first part 601 located at the top of the initial semiconductor pillar 04 is patterned. Then, according to a formed pattern, part of the first part 601 located at the top of the initial semiconductor pillar 04 is removed, so that an initial groove is formed at the top of the initial semiconductor pillar 04. Finally, the second part 602 is filled into the initial groove.

Figure 10:
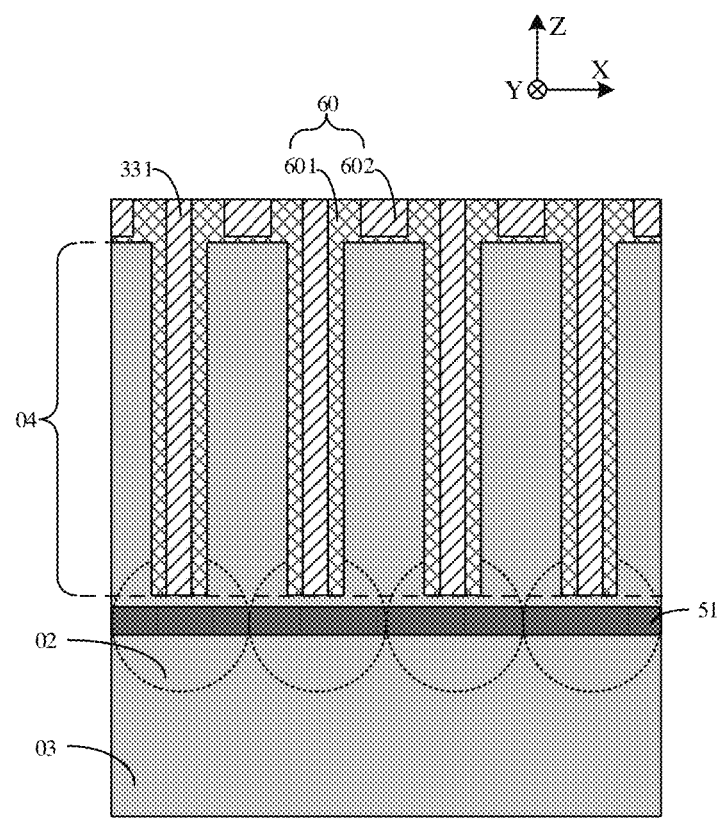
FIG. 10 is a schematic diagram II of a method for manufacturing a semiconductor structure according to an embodiment of the present disclosure.
Figure 11:
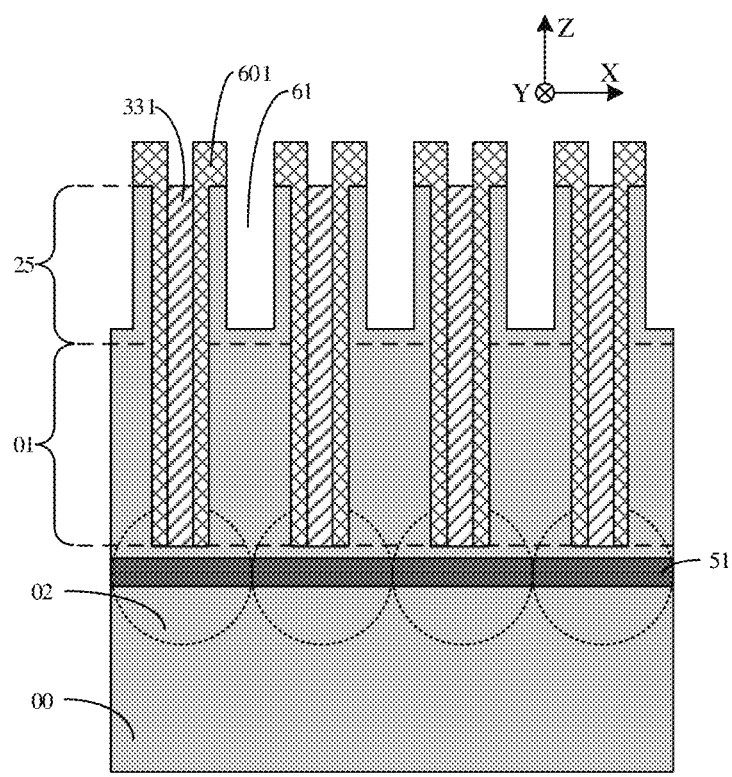
FIG. 11 is a schematic diagram III of a method for manufacturing a semiconductor structure according to an embodiment of the present disclosure.

In the embodiment of the present disclosure, referring to FIG. 10 and FIG. 11, etching may be performed according to a certain selection ratio, only the second part 602 and part of the initial semiconductor pillar 04 covered by the second part 602 are removed, and a groove structure 61 is formed in the middle of the initial semiconductor pillar 04. Therefore, as shown in FIG. 11, the remaining initial semiconductor pillar 04 after forming the groove structure 61 forms an initial electrode plate structure 25, that is, the sidewall and the bottom wall of the groove structure 61 form the initial electrode plate structure 25. The initial semiconductor pillar 04 located below the groove structure 61 forms semiconductor pillar 01.

Figure 12:
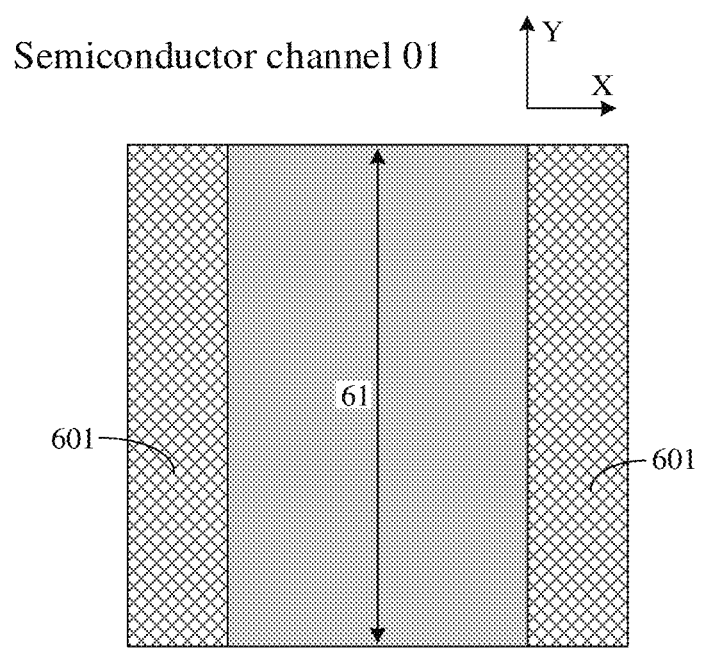
FIG. 12 is a schematic diagram IV of a method for manufacturing a semiconductor structure according to an embodiment of the present disclosure.

FIG. 12 is a top view of a single groove structure 61. Referring to FIG. 10 to FIG. 12, the groove structure 61 extends in the second direction Y and penetrates through the initial semiconductor pillar 04.

In this way, referring to FIG. 11, the substrate 00 is formed. The substrate 00 includes the discrete semiconductor pillars 01. The semiconductor pillars 01 are arranged at the top of the substrate 00 and extend in the vertical direction Z. The substrate 00 further includes the initial electrode plate structure 25. The initial electrode plate structure 25 is located at the top of the semiconductor pillar 01.

In another embodiment, the formed groove structure 61 may also be of an annular structure with four side faces, so as to form a capacitor as shown in FIG. 3A and FIG. 3B.

In the embodiment of the present disclosure, referring to FIG. 9 and FIG. 10, before the groove structure 61 is formed, a first part 331 of the initial isolation layer may be deposited. The first part 331 of the initial isolation layer extends in the second direction Y to isolate the adjacent initial semiconductor pillars 04. The material of the first part 331 of the initial isolation layer may be silicon nitride.

At S102, a dielectric layer 30 is formed on the sidewall of the semiconductor pillar 01.

Figure 13:
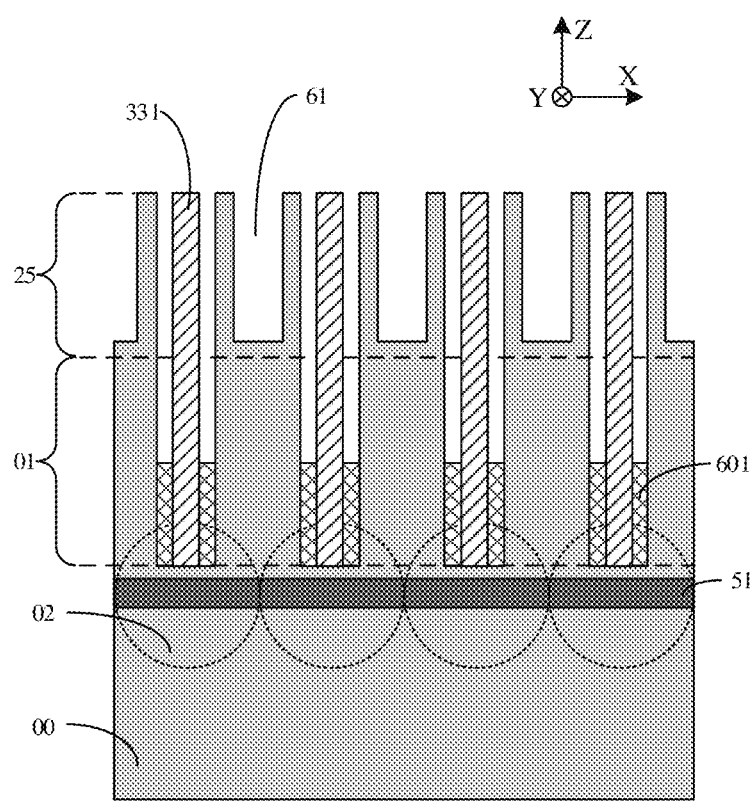
FIG. 13 is a schematic diagram V of a method for manufacturing a semiconductor structure according to an embodiment of the present disclosure.
Figure 14:
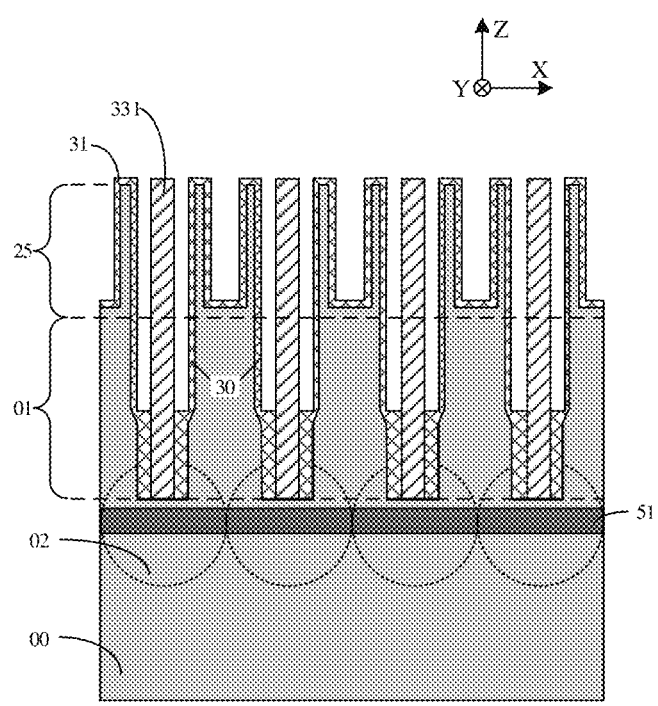
FIG. 14 is a schematic diagram VI of a method for manufacturing a semiconductor structure according to an embodiment of the present disclosure.

In the embodiment of the present disclosure, referring to FIG. 13 and FIG. 14, after the substrate 00 is formed, firstly, part of the sidewall of the semiconductor pillar 01 may be etched, so that the width of the middle area of the semiconductor pillar 01 is smaller than the width of the bottom of the semiconductor pillar 01, thereby providing a larger space for the subsequent formation of the gate structure. The above width may be the width in the first direction X.

Then, an initial dielectric layer 31 is formed on the sidewall of the semiconductor pillar 01. The part of the initial dielectric layer 31 located at the middle area of the semiconductor pillar 01 forms the dielectric layer 30. The material of the initial dielectric layer 31 is an insulating material, which may be silicon oxide.

At S103, a gate structure 10 is formed at the middle area of the semiconductor pillar 01.

Figure 15:
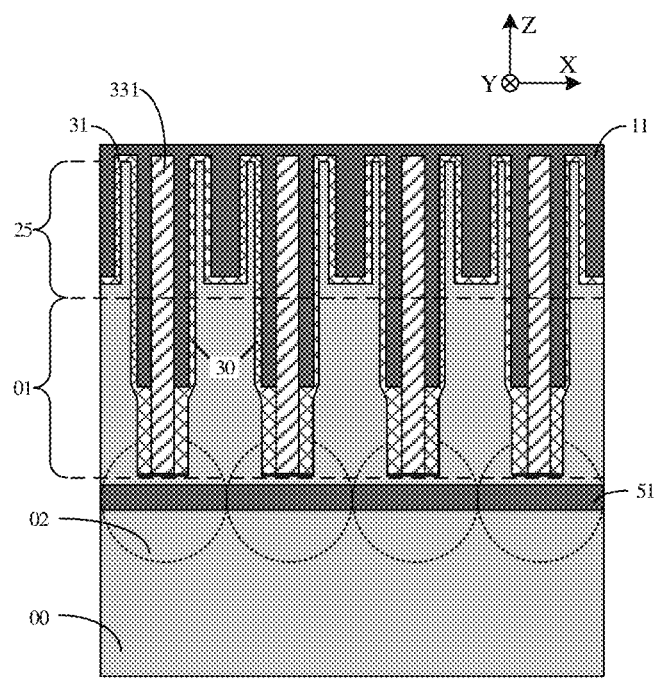
FIG. 15 is a schematic diagram VII of a method for manufacturing a semiconductor structure according to an embodiment of the present disclosure.

In the embodiment of the present disclosure, referring to FIG. 14 and FIG. 15, after the initial dielectric layer 31 is formed, the gate layer 11 may be formed around the sidewall of the initial dielectric layer 31. The material of the gate layer 11 may be a conductive material such as titanium nitride.

Then, referring to FIG. 15 and FIG. 16, the gate layer 11 may be etched back and the gate layer 11 is etched below the top of the semiconductor pillar 01, and the remaining gate layer 11 forms the gate structure 10. In this way, as shown in FIG. 16, the gate structure 10 surrounds the semiconductor pillar 01, and the dielectric layer 30 is located between the gate structure 10 and the semiconductor pillar 01.

At S104, a capacitor structure 20 is formed at the initial electrode plate structure 25.

Figure 16:
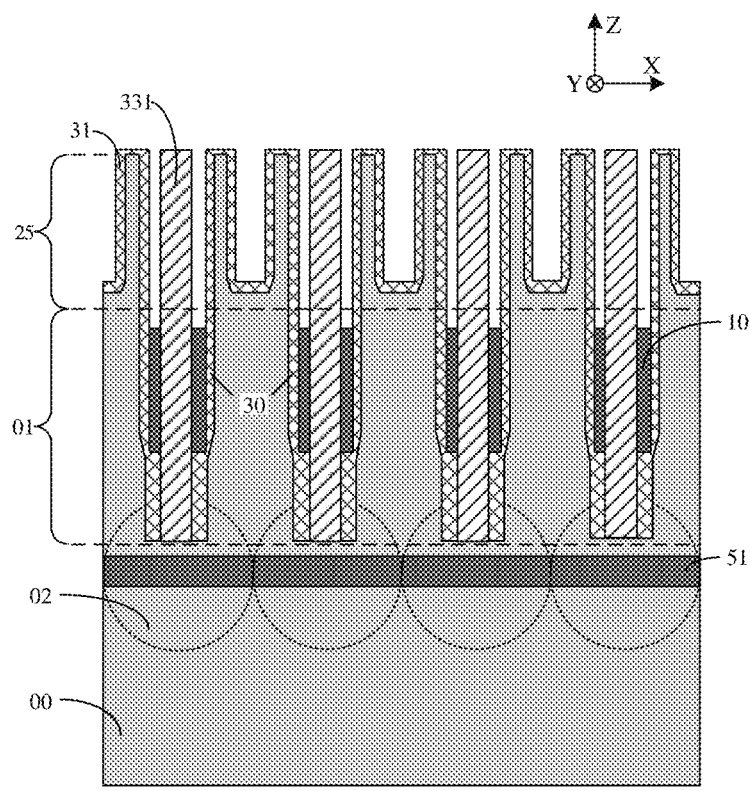
FIG. 16 is a schematic diagram VIII of a method for manufacturing a semiconductor structure according to an embodiment of the present disclosure.
Figure 17:
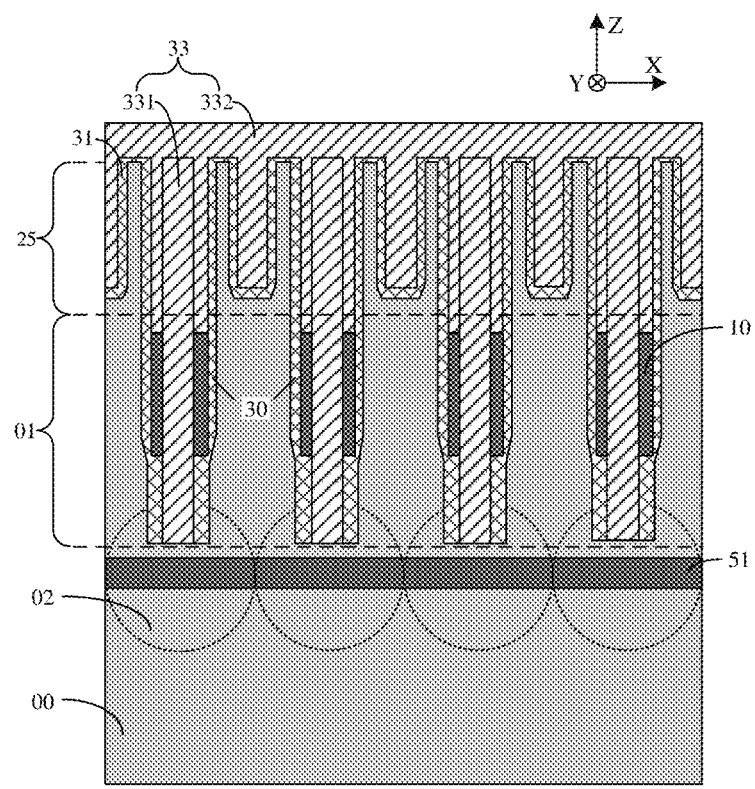
FIG. 17 is a schematic diagram IX of a method for manufacturing a semiconductor structure according to an embodiment of the present disclosure.

In the embodiment of the present disclosure, referring to FIG. 16 and FIG. 17, after the gate structure 10 is formed, a second part 332 of the initial isolation layer may be deposited, thereby forming the initial isolation layer 33 including the first part 331 and the second part 332. The initial isolation layer 33 covers the initial dielectric layer 31 and the gate structure 10.

Figure 18:
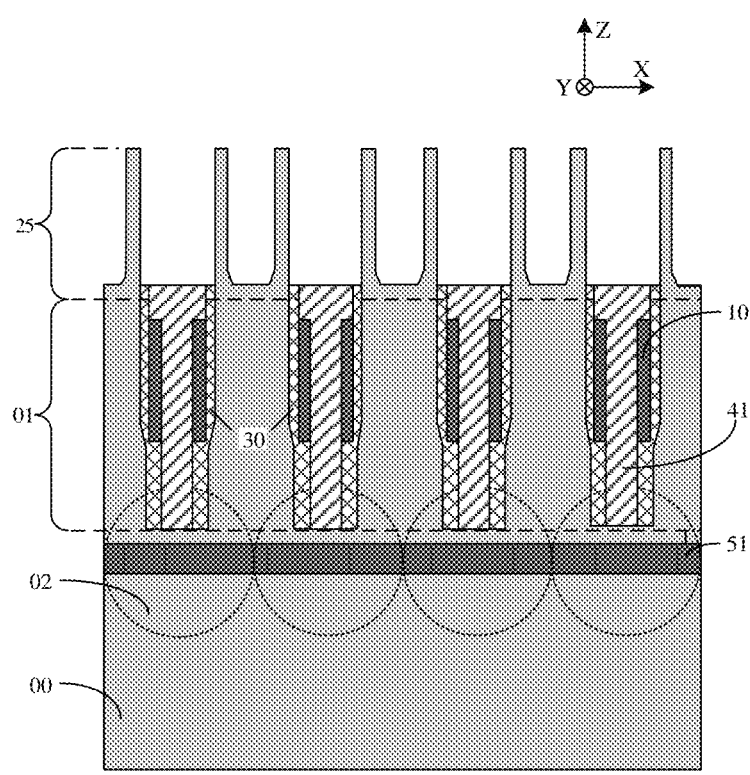
FIG. 18 is a schematic diagram X of a method for manufacturing a semiconductor structure according to an embodiment of the present disclosure.

Then, referring to FIG. 17 and FIG. 18, the initial isolation layer 33 and the initial dielectric layer 31 may be etched until the top of the semiconductor pillar 01 and the sidewall of the initial electrode plate structure 25 are exposed. In this way, the remaining initial isolation layer 33 forms the first isolation layer 41 between the adjacent semiconductor pillars 01. The first isolation layer 41 extends in the second direction Y, and isolates and insulates adjacent gate structures 10 in the first direction X from each other. Moreover, the first isolation layer 41 covers the top of the gate structure 10, and isolates and insulates the gate structure 10 from the areas located above.

Figure 19:
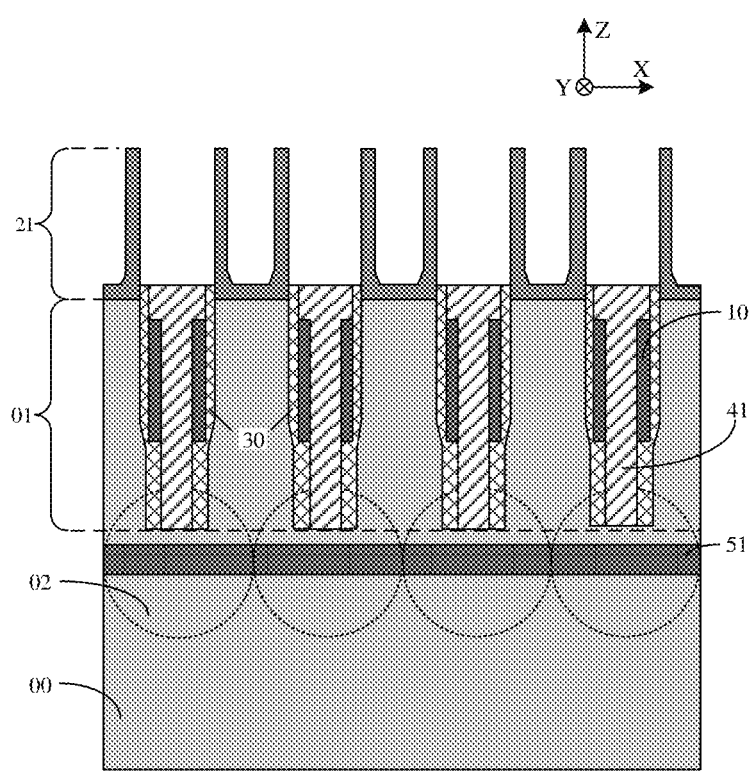
FIG. 19 is a schematic diagram XI of a method for manufacturing a semiconductor structure according to an embodiment of the present disclosure.

Then, referring to FIG. 18 and FIG. 19, a metal layer (not shown in the figure) may be formed on the surface of the initial electrode plate structure 25. Then, heat treatment is performed on the initial electrode plate structure 25 and the metal layer, and the unreacted metal layer is removed, so that the initial electrode plate structure 25 forms a first electrode plate 21 of the capacitor structure 20. The material of the initial electrode plate structure 25 may include a silicon element semiconductor, and the material of the first electrode plate 21 may include at least a metal silicide.

Figure 20:
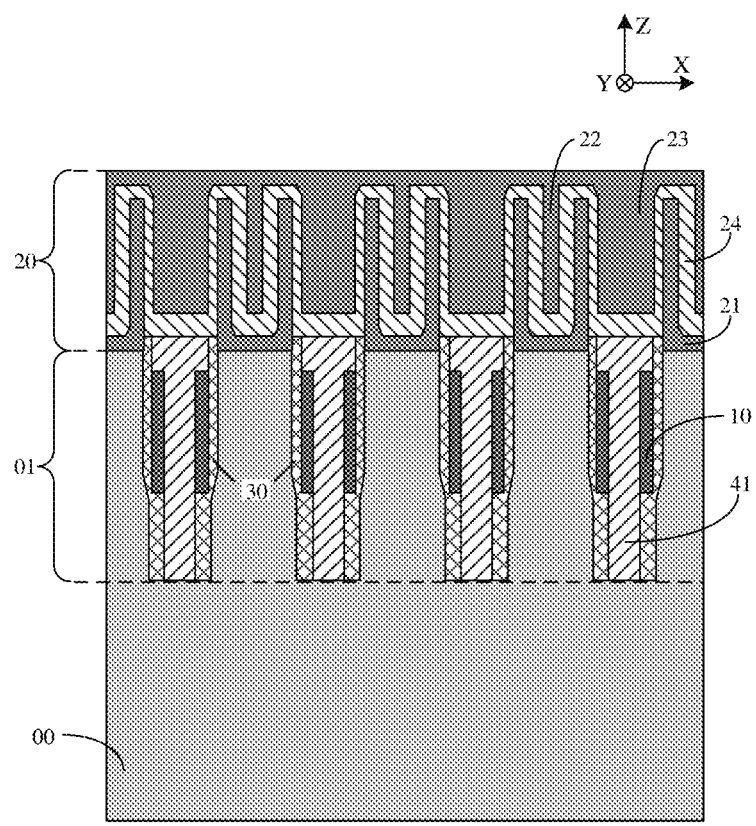
FIG. 20 is a schematic diagram XII of a method for manufacturing a semiconductor structure according to an embodiment of the present disclosure.

Then, referring to FIG. 19 and FIG. 20, a capacitor dielectric layer 24 may be deposited to cover the surface of the first electrode plate 21.

Then, a second electrode plate 22 and a third electrode plate 23 may be formed on the capacitor dielectric layer 24.

As shown in FIG. 20, the capacitor dielectric layer 24 is arranged between the second electrode plate 22 and the first electrode plate 21, and the capacitor dielectric layer 24 is also arranged between the third electrode plate 23 and the first electrode plate 21. In this way, the second electrode plate 22 and the first electrode plate 21 may form a set of directly opposite electrode plates, and the third electrode plate 23 and the first electrode plate 21 may also form a set of directly opposite electrode plates, so that a structure of a "double-sided capacitor" may be formed. Moreover, referring to FIG. 3A or FIG. 4A, the top of the second electrode plate 22 and the top of the third electrode plate 23 are electrically connected, and the second electrode plate 22 and the third electrode plate 23 may together constitute an upper electrode plate of the capacitor structure 20, and the first electrode plate 21 may constitute a lower electrode plate of the capacitor structure 20. The use of the structure of the "double-sided capacitor" may increase the directly opposite electrode plate area between the upper electrode plate and the lower electrode plate of the capacitor structure 20, thereby increasing the capacitance of the capacitor structure 20.

It is understood that, on the one hand, the semiconductor pillar 01 and the capacitor structure 20 are of a one-piece structure, and their connection is tighter and the contact resistance is lower, so that the overall performance of the semiconductor structure 80 may be improved. On the other hand, the one-piece structure allows the overall height of the semiconductor pillar 01 and the capacitor structure 20 to be reduced, thereby improving the integration degree of the semiconductor structure 80 in the vertical direction. Further, the processing of the semiconductor pillar 01 and the electrode plate of the capacitor structure 20 may be performed at the same time, so that the process steps are simplified, thereby improving the efficiency and saving the cost.

In some embodiments of the present disclosure, referring to FIG. 9 to FIG. 11, the step that the substrate 00 is formed includes S201 to S202, which will be described with reference to each step.

At S201, an initial substrate 03 is provided.

In the embodiment of the present disclosure, referring to FIG. 9, the initial substrate 03 includes discrete initial semiconductor pillars 04. The initial semiconductor pillars 04 are arranged at the top of the initial substrate 03 and extend in a vertical direction Z.

Herein, the initial substrate 03 may include at least one of semiconductor materials. Exemplarily, the initial substrate 03 including the silicon element is illustrated hereinafter. The initial semiconductor pillar 04 may have a doping element to improve the conductivity of the initial semiconductor pillar 04. Herein, the doping element may be a P-type doping element or an N-type doping element.

At S202, a groove structure 61 is formed at the top of the initial semiconductor pillar 04.

In the embodiment of the present disclosure, referring to FIG. 9, the initial semiconductor pillar 04 is further covered with a mask layer 60. A first part 601 of the mask layer 60 covers the sidewall and the top of the initial semiconductor pillar 04, and the middle of the first part 601 is filled with a second part 602 of the mask layer 60. The materials of the first part 601 and the second part 602 of the mask layer 60 are different. For example, the material of the first part 601 is silicon oxide, and the material of the second part 602 is silicon nitride.

In the embodiment of the present disclosure, referring to FIG. 10 and FIG. 11, etching may be performed according to a certain selection ratio, only the second part 602 and part of the initial semiconductor pillar 04 covered by the second part 602 are removed, and a groove structure 61 is formed in the middle of the initial semiconductor pillar 04. Thus, as shown in FIG. 11, the part of the initial semiconductor pillar 04 surrounding the groove structure 61 forms an initial electrode plate structure 25, that is, the sidewall and the bottom wall of the groove structure 61 form the initial electrode plate structure 25. The initial semiconductor pillar 04 located below the groove structure 61 forms the semiconductor pillar 01. In this way, the substrate 00 is formed.

FIG. 12 is a top view of a single groove structure 61. Referring to FIG. 10 to FIG. 12, the groove structure 61 extends in the second direction Y and penetrates through the initial semiconductor pillar 04.

It is understood that, the groove structure 61 is formed by etching the initial semiconductor pillar 04, so that the initial semiconductor pillar 04 is processed into the semiconductor pillar 01 and the initial electrode plate structure 25, thereby providing a basis for the formation of the first transistor and the capacitor structure. Moreover, since the semiconductor pillar 01 and the initial electrode plate structure 25 are of a one-piece structure, the contact resistance thereof is lower, so that the overall performance of the formed semiconductor structure may be improved.

In some embodiments of the present disclosure, referring to FIG. 13 to FIG. 14, the step that the dielectric layer 30 is formed includes S301 to S302, which will be described with reference to each step.

At S301, the first part 601 of the mask layer 60 is etched back. The remaining first part 601 is located at the bottom of the semiconductor pillar 01, and is configured to isolate the bit line 51 below the semiconductor pillar 01 from the gate layer 11. The semiconductor pillar 01 wrapped by the remaining first part 601 forms the source or drain of the transistor. The exposed sidewall of the semiconductor pillar 01 is etched, so that the width of the middle and upper areas of the semiconductor pillar 01 is smaller than the width of the bottom of the semiconductor pillar 01. The width of the middle and upper areas of the semiconductor pillar 01 is 0.9 to 0.6 times the width of the bottom of the semiconductor pillar 01.

In the embodiment of the present disclosure, referring to FIG. 13 and FIG. 14, after the substrate 00 is formed, part of the sidewall of the semiconductor pillar 01 may be etched, so that the width of the middle area of the semiconductor pillar 01 is smaller than the width of the bottom of the semiconductor pillar 01. In this way, a larger space may be provided for the subsequent formation of the gate structure. The above width may be the width in the first direction X.

At S302, an initial dielectric layer 31 is formed on the sidewall of the semiconductor pillar 01, and the part of the initial dielectric layer 31 located at the middle area of the semiconductor pillar 01 forms the dielectric layer 30.

In the embodiment of the present disclosure, referring to FIG. 13 and FIG. 14, after part of the sidewall of the semiconductor pillar 01 is etched, the initial dielectric layer 31 may be formed on the sidewall of the semiconductor pillar 01. The initial dielectric layer 31 is formed by an oxidation process of the semiconductor pillar 01, and the part of the initial dielectric layer 31 located at the middle area of the semiconductor pillar 01 forms the dielectric layer 30. The material of the initial dielectric layer 31 is an insulating material, which may be silicon oxide.

In some embodiments of the present disclosure, referring to FIG. 14 to FIG. 16, the step that the gate structure 10 is formed includes S401 to S402, which will be described with reference to each step.

At S401, the initial dielectric layer 31 is covered to form a gate layer 11.

In the embodiment of the present disclosure, referring to FIG. 14 and FIG. 15, after the initial dielectric layer 31 is formed, the gate layer 11 may be formed around the sidewall of the initial dielectric layer 31. The material of the gate layer 11 may be a conductive material such as polysilicon, titanium nitride or the like.

At S402, the top of the gate layer 11 is etched, and the remaining gate layer 11 located at the middle area of the semiconductor pillar 01 forms the gate structure 10.

In the embodiment of the present disclosure, referring to FIG. 15 and FIG. 16, after the gate layer 11 is formed, the top of the gate layer 11 may be etched back, and the gate layer 11 may be etched below the top of the semiconductor pillar 01, then the remaining gate layer 11 at the middle area of the semiconductor pillar 01 forms the gate structure 10. In this way, as shown in FIG. 16, the gate structure 10 surrounds the semiconductor pillar 01, and the dielectric layer 30 is located between the gate structure 10 and the semiconductor pillar 01.

In some embodiments of the present disclosure, referring to FIG. 10 and FIG. 16 to FIG. 18, after the gate structure 10 is formed, the manufacturing method further includes S501 to S502, which will be described with reference to each step.

At S501, the initial dielectric layer 31 and the gate structure 10 are covered to form an initial isolation layer 33.

In the embodiment of the present disclosure, referring to FIG. 10, the first part 331 of the initial isolation layer may be deposited between the adjacent initial semiconductor pillars 04. The first part 331 of the initial isolation layer extends in the second direction Y to isolate the adjacent initial semiconductor pillars 04. The material of the first part 331 of the initial isolation layer may be silicon nitride.

In the embodiment of the present disclosure, referring to FIG. 16 and FIG. 17, after the gate structure 10 is formed, a second part 332 of the initial isolation layer may be deposited, thereby forming the initial isolation layer 33 including the first part 331 and the second part 332. The initial isolation layer 33 covers the initial dielectric layer 31 and the gate structure 10.

At S502, the initial isolation layer 33 and the initial dielectric layer 31 are etched until the top of the semiconductor pillar 01 and the sidewall of the initial electrode plate structure 25 are exposed.

In the embodiment of the present disclosure, referring to FIG. 17 and FIG. 18, after the initial isolation layer 33 is formed, the initial isolation layer 33 and the initial dielectric layer 31 may be etched until the top of the semiconductor pillar 01 and the sidewall of the initial electrode plate structure 25 are exposed, so that the remaining initial isolation layer 33 forms the first isolation layer 41 between the adjacent semiconductor pillars 01. The first isolation layer 41 extends in the second direction Y, and isolates and insulates the adjacent gate structures 10 in the first direction X from each other. Moreover, the first isolation layer 41 covers the top of the gate structure 10, and isolates and insulates the gate structure 10 from the areas located above.

In some embodiments of the present disclosure, referring to FIG. 18 to FIG. 20, the step that the capacitor structure 20 is formed includes S601 to S603, which will be described with reference to each step.

At S601, a metal layer on the surface of the initial electrode plate structure 25.

In the embodiment of the present disclosure, referring to FIG. 18 and FIG. 19, after etching is performed to expose the top of the semiconductor pillar 01 and the sidewall of the initial electrode plate structure 25, the metal layer (not shown in the figure) may be formed on the surface of the initial electrode plate structure 25.

At S602, heat treatment is performed on the initial electrode plate structure 25 and the metal layer to form a first electrode plate 21 of the capacitor structure 20.

In the embodiment of the present disclosure, the material of the initial electrode plate structure 25 may include a silicon element semiconductor, and the material of the first electrode plate 21 may include at least a metal silicide. Heat treatment is performed on the initial electrode plate structure 25 and the metal layer formed on the surface thereof, and a conductive metal silicide as the first electrode plate 21 may be generated by reaction.

At S603, a capacitor dielectric layer 24, a second electrode plate 22 and a third electrode plate 23 are formed on the first electrode plate 21.

In the embodiment of the present disclosure, referring to FIG. 19 and FIG. 20, after the first electrode plate 21 is formed, the capacitor dielectric layer 24 may be deposited to cover the surface of the first electrode plate 21. Then, the second electrode plate 22 and the third electrode plate 23 may be formed on the capacitor dielectric layer 24.

As shown in FIG. 20, the capacitor dielectric layer 24 is arranged between the second electrode plate 22 and the first electrode plate 21, and the capacitor dielectric layer 24 is also arranged between the third electrode plate 23 and the first electrode plate 21. In this way, the second electrode plate 22 and the first electrode plate 21 may form a set of directly opposite electrode plates, and the third electrode plate 23 and the first electrode plate 21 may also form a set of directly opposite electrode plates, so that a structure of a "double-sided capacitor" may be formed. Moreover, referring to FIG. 3A or FIG. 4A, the top of the second electrode plate 22 and the top of the third electrode plate 23 are electrically connected, and the second electrode plate 22 and the third electrode plate 23 may together constitute an upper electrode plate of the capacitor structure 20, and the first electrode plate 21 may constitute a lower electrode plate of the capacitor structure 20.

It is understood that, the use of the structure of the "double-sided capacitor" may increase the directly opposite electrode plate area between the upper electrode plate and the lower electrode plate of the capacitor structure 20, thereby increasing the capacitance of the capacitor structure 20.

It is to be noted that, in the present disclosure, terms "include" and "contain" or any other variant thereof are intended to refer to nonexclusive inclusions herein, so that a process, method, object or device including a series of elements not only includes those elements, but may further include other elements which are not clearly listed or may further include elements intrinsic to the process, the method, the object or the device. Unless otherwise specified, an element defined by the statement "including a/an . . . " does not exclude the presence of an additional same element in the process, method, object or device including the element.

The sequence numbers of the embodiments of the present disclosure are merely used for description and they do not represent superiority-inferiority of the embodiments. The methods disclosed in the several method embodiments provided in the present disclosure may be combined arbitrarily without conflict to obtain new method embodiments. The features disclosed in the several product embodiments provided in the present disclosure may be combined arbitrarily without conflict to obtain new product embodiments. The features disclosed in several method or device embodiments provided in the present disclosure may be combined arbitrarily without conflict to obtain new method embodiments or device embodiments.

The above is only the specific implementation mode of the present disclosure and not intended to limit the scope of protection of the present disclosure. Any variations or replacements easily obtained by those skilled in the art with reference to the technical scope disclosed by the present disclosure shall fall within the scope of protection of the present disclosure. Therefore, the scope of protection of the present disclosure shall be subject to the scope of protection of the claims.

INDUSTRIAL APPLICABILITY

Embodiments of the present disclosure provide a semiconductor structure and a method for manufacturing the same. The semiconductor structure includes: a substrate, a gate structure and a dielectric layer. Herein, the substrate includes discrete semiconductor pillars. The semiconductor pillars are arranged at the top of the substrate and extend in a vertical direction. The semiconductor structure further includes a capacitor structure located at the top of the semiconductor pillar. The gate structure is arranged at the middle area of the semiconductor pillar and surrounds the semiconductor pillar. The dielectric layer is located between the gate structure and the semiconductor pillar, and covers the sidewall of the semiconductor pillar. In this way, on the one hand, both the semiconductor pillar and the capacitor structure belong to a part of the substrate, that is, the semiconductor pillar and the capacitor structure are of a one-piece structure, their connection is tighter and the contact resistance is lower, so that the overall performance of the semiconductor structure may be improved. On the other hand, the one-piece structure allows the overall height of the semiconductor pillar and the capacitor structure to be reduced, thereby improving the integration degree of the semiconductor structure in the vertical direction. Further, the processing of the semiconductor pillar and the electrode plate of the capacitor structure may be performed at the same time, so that the process steps are simplified, thereby improving the efficiency and saving the cost.

The invention claimed is:

1. A semiconductor structure, comprising:
   a substrate comprising discrete semiconductor pillars, the semiconductor pillars being arranged at a top of the substrate and extending in a vertical direction, and the substrate further comprising a capacitor structure located at a top of the semiconductor pillar;
   a gate structure, which is arranged at a middle area of the semiconductor pillar and surrounds the semiconductor pillar; and
   a dielectric layer, which is located between the gate structure and the semiconductor pillar, and covers a sidewall of the semiconductor pillar;
   wherein the capacitor structure comprises a first electrode plate;

the first electrode plate is provided with a groove structure, and the first electrode plate comprises a first contact part; the first contact part is perpendicular to the vertical direction, and covers a top surface of the semiconductor pillar, and the dielectric layer is laterally overlapped with the first contact part.

2. The semiconductor structure of claim 1, wherein the first electrode plate further comprises a second contact part;
the second contact part is located on the first contact part and is arranged around the first contact part;
the second contact part extends in the vertical direction, and is connected to an edge of the first contact part; and
a thickness of the second contact part is smaller than a width of the semiconductor pillar.

3. The semiconductor structure of claim 1, wherein the first electrode plate further comprises a third contact part and a fourth contact part;
the third contact part and the fourth contact part are separately arranged on the first contact part;
the third contact part and the fourth contact part both extend in the vertical direction; the third contact part and the fourth contact part are respectively connected to an edge of the first contact part; and
thicknesses of the third contact part and the fourth contact part are both smaller than a width of the semiconductor pillar.

4. The semiconductor structure of claim 1, wherein the capacitor structure further comprises a second electrode plate and a third electrode plate;
the second electrode plate is arranged inside the first electrode plate, and the third electrode plate is arranged outside the first electrode plate; and
a capacitor dielectric layer is arranged between the second electrode plate and the first electrode plate, and between the third electrode plate and the first electrode plate.

5. The semiconductor structure of claim 1, wherein a material of the semiconductor pillar comprises a silicon element semiconductor; and
a material of the first electrode plate comprises at least a metal silicide.

6. The semiconductor structure of claim 1, further comprising:
a first isolation layer, which is located between adjacent semiconductor pillars, and the gate structure being located between the first isolation layer and the semiconductor pillar.

7. The semiconductor structure of claim 6, wherein the first isolation layer further covers a top surface of the gate structure; and a width of the first isolation layer is greater than a thickness of the dielectric layer.

8. The semiconductor structure of claim 1, further comprising a bit line;
wherein the bit line is located in the substrate, and a bottom of the semiconductor pillar is electrically connected with the bit line.

9. A method for manufacturing a semiconductor structure, comprising:
providing a substrate, the substrate comprising discrete semiconductor pillars, the semiconductor pillars being arranged at a top of the substrate and extending in a vertical direction, and the substrate further comprising an initial electrode plate structure located at a top of the semiconductor pillar;
forming a dielectric layer on a sidewall of the semiconductor pillar;
forming a gate structure at a middle area of the semiconductor pillar, the gate structure surrounding the semiconductor pillar, and the dielectric layer being located between the gate structure and the semiconductor pillar; and
forming a capacitor structure at the initial electrode plate structure;
wherein the providing a substrate comprises:
providing an initial substrate comprising discrete initial semiconductor pillars, wherein the initial semiconductor pillars are arranged at a top of the initial substrate and extend in a vertical direction; and
forming a groove in the initial semiconductor pillar, wherein a sidewall and a bottom wall of the groove form the initial electrode plate structure, and the initial semiconductor pillar below the groove forms the semiconductor pillar.

10. The method of claim 9, wherein a step of forming the capacitor structure comprises:
forming a metal layer on a surface of the initial electrode plate structure; and
performing heat treatment on the initial electrode plate structure and the metal layer to form a first electrode plate of the capacitor structure.

11. The method of claim 10, wherein a material of the initial electrode plate structure comprises a silicon element semiconductor; and
a material of the first electrode plate comprises at least a metal silicide.

12. The method of claim 9, wherein a step of forming the dielectric layer comprises:
etching part of a sidewall of the semiconductor pillar, so that a width of a middle area of the semiconductor pillar is smaller than a width of a bottom of the semiconductor pillar; and
forming an initial dielectric layer on the sidewall of the semiconductor pillar, wherein the initial dielectric layer located at the middle area of the semiconductor pillar forms the dielectric layer.

13. The method of claim 12, wherein a step of forming the gate structure comprises:
covering the initial dielectric layer to form a gate layer; and
etching a top of the gate layer, wherein the gate layer located at the middle area of the semiconductor pillar, which is remained, forms the gate structure.

14. The method of claim 13, wherein, after etching the gate layer to form the gate structure, the method further comprises:
covering the initial dielectric layer and the gate structure to form an initial isolation layer; and
etching the initial isolation layer and the initial dielectric layer until a top of the semiconductor pillar and a sidewall of the initial electrode plate structure are exposed, wherein the initial isolation layer remained forms a first isolation layer between adjacent semiconductor pillars.

* * * * *